R. C. STEVENS.
VALVE OPERATING MECHANISM.
APPLICATION FILED AUG. 30, 1915.
1,202,913.
Patented Oct. 31, 1916.
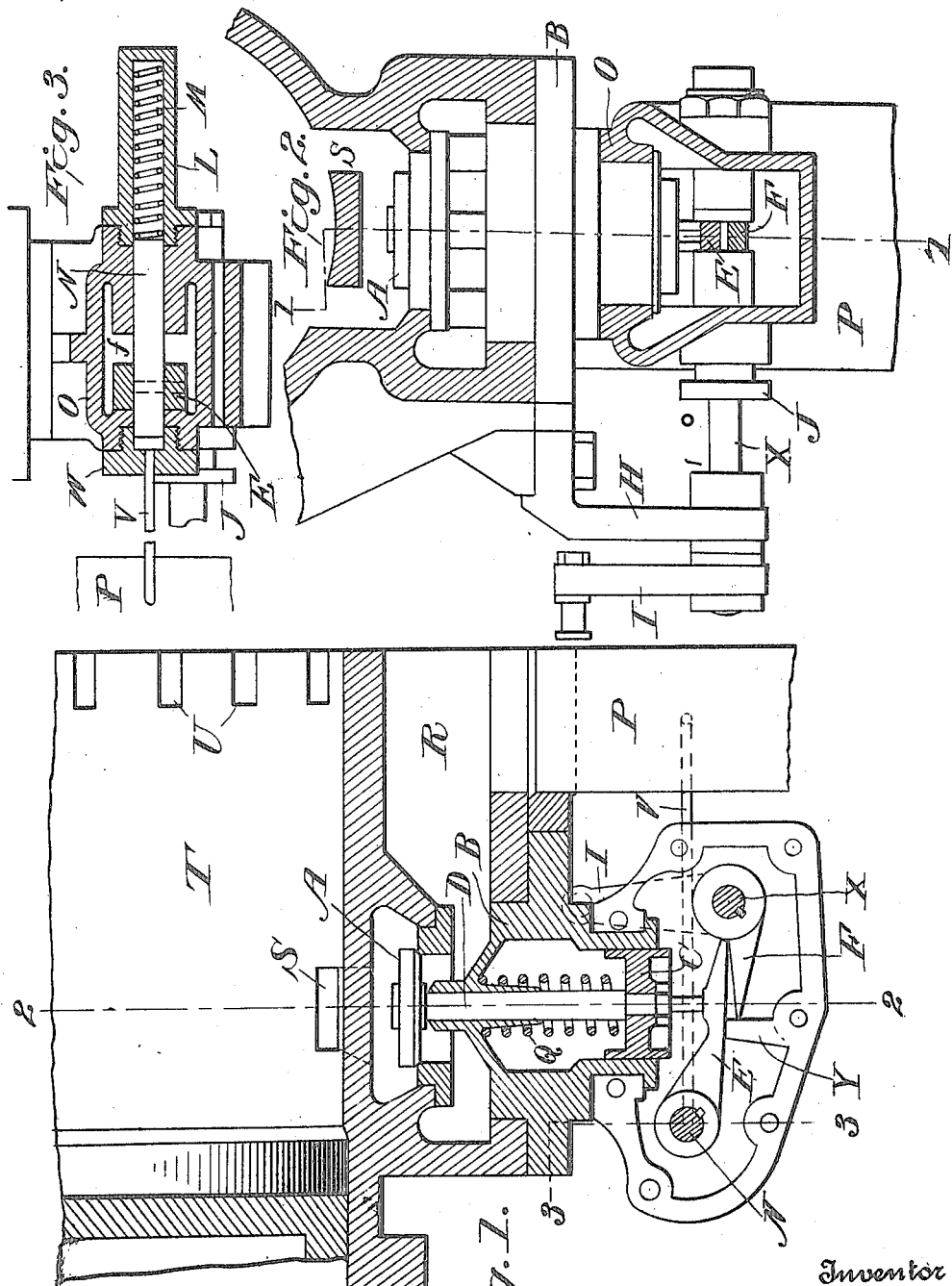

UNITED STATES PATENT OFFICE.

ROBERT C. STEVENS, OF ERIE, PENNSYLVANIA, ASSIGNOR TO SKINNER ENGINE COMPANY, OF ERIE, PENNSYLVANIA, A CORPORATION.

VALVE-OPERATING MECHANISM.

1,202,913.

Specification of Letters Patent.

Patented Oct. 31, 1916.

Application filed August 30, 1915. Serial No. 48,071.

*To all whom it may concern:*

Be it known that I, ROBERT C. STEVENS, a citizen of the United States, residing at Erie, in the county of Erie and State of Pennsylvania, have invented certain new and useful Improvements in Valve-Operating Mechanism, of which the following is a specification.

In the Williams Skinner Patent No. 1109807 there is shown an engine of the uniflow type, having a central exhaust at the middle of the cylinder and auxiliary exhaust passages located between the middle exhaust ports and the ends of the cylinder, and said patent shows a valve operating gear which, when the engine is operating non-condensing, acts on the auxiliary exhaust valves to operate the same in proper time, to avoid excessive compression, and said gear is so controlled that it is automatically put out of operation by the action of vacuum in the exhaust pipe, as when the engine is running condensing, at which time there is no reason for the operation of the auxiliary valves. When the gear in inoperative, the auxiliary exhaust valves are held closed.

The present invention embodies a modification of the above named structure, and has for its object to provide for a condition in which an engine operates non-condensing, say at or against atmospheric pressure a portion of the time and a portion of the time against a considerable back pressure. Such a condition may exist where the exhaust steam from the engine is conducted to other apparatus, such as a heating system or the like, and it is desirable to control the operation of the auxiliary exhaust valves according to the amount of back pressure, whereby under a certain amount of back pressure, said exhaust valves are caused to operate, but remain closed at other times. Thereby, broadly speaking, said valves are controlled by the amount of pressure in the exhaust pipe, under non-condensing conditions, as distinguished from the control by the presence or absence of vacuum in the exhaust pipe under alternative condensing or non-condensing conditions.

One embodiment of the invention is illustrated in the accompanying drawings, in which—

Figure 1 is a partial longitudinal section of a uniflow cylinder and an auxiliary exhaust valve, on the line 1—1 of Fig. 2. Fig. 2 is a cross section on the line 2—2 of Fig. 1. Fig. 3 is a detail in section on the line 3—3 of Fig. 1, showing the controlling device.

Referring specifically to the drawings, T is the cylinder; U the middle exhaust ports; S the auxiliary exhaust ports, located between the middle ports and the cylinder heads; R the exhaust passage; and P the exhaust pipe leading therefrom.

A is the auxiliary exhaust valve, of the puppet type, and D its spindle leading through the valve casing B down to an idler cam or lever E which in turn is operated by the lifter F, which is operated by the rocker arm I and its shaft X to which it is secured. The rocker arm is operated positively by an eccentric on the crank shaft (not shown) or by attachment to some equivalent moving part of the engine. There is a guide C secured to the valve stem, and above it a coiled spring Q tending to close the valve.

The idler E is fixed to a shaft N, which has end play, and is normally held in an inoperative position by a spring M in a tubular casing L. The gear is located in a closed casing O which forms an oil chamber.

J is a stuffing box to prevent oil leak along the shaft X, and W is a cap screw which closes the chamber in which the end of the shaft N operates. A pipe V is tapped into the screw plug W and is connected to the exhaust pipe P, connecting the chamber at the end of the shaft N with the exhaust pipe of the engine, whereby the end of said shaft receives the pressure in the exhaust pipe.

Now, assuming that the exhaust pipe P is connected to accessory apparatus, it will be seen that the operation of the valve A is controlled by said pressure. Up to a certain pressure, the spring M will hold the shaft N shifted to the left, in which position, as stated, the idler E will be out of line with the valve stem and said valve will stay closed. But when the back pressure reaches a certain amount, it will act on the shaft N and shift the same to the right, carrying the idler E to operative position, at which time, when the shaft X is rocked, the lifter F comes in contact with the idler E, thereto lifting it and also lifting the valve A, and permitting auxiliary exhaust from the cylinder, at least until the piston passes over and closes the ports S in the usual manner. When the motion is reversed the valve follows the movement of the lifter F downward until it seats, at which time the idler E reaches its rest Y, which is a projection on the inside of the casing, in which position the idler E leaves the valve stem D a trifling space, so that the idler is free to slide sidewise. The operation of the auxiliary exhaust valve continues while the back pressure from the exhaust pipe continues great enough to overcome the pressure of the spring M. When the pressure falls to the normal or desired amount, the spring M shifts the shaft N to the left, and throws the lifter E out of action, the valve A remaining closed while said condition exists.

It will be seen that the device provides means controlled by increase of pressure in the exhaust pipe for making the gear operative, and for holding the valve closed when the gear is inoperative. In the former patent referred to, the spring tends to shift the gear to operative position and vacuum in the exhaust pipe acts against the spring to make the gear inoperative and back pressure in the exhaust pipe acts against the spring pressure to make the gear operative, the structure differing accordingly.

The scope within which the valve operates or ceases to operate depends on the strength of the spring M. For example, assuming an engine operating non-condensing at atmospheric pressure a part of the time and a part of the time against back pressure in a heater or other apparatus to which the exhaust pipe P may be connected, and that the pressure of the spring M is ten pounds: as long as the back pressure remains below that amount the valve remains inoperative but when it exceeds that amount the spring M is compressed and the gear picks up and operates the valve. The maximum back pressure desired determines the strength of the spring selected.

I claim:

1. In a valve controlling mechanism for steam engines, the combination of an exhaust valve, means for operating said valve, a spring tending to hold said means in inoperative position, means actuated by the exhaust pressure of the engine in opposition to said spring for making said means operative, and means for holding said valve closed when the said means are inoperative.

2. The combination with a steam engine cylinder having main and auxiliary exhaust ports, and an exhaust pipe leading therefrom, a valve controlling the auxiliary exhaust port, a gear for operating said valve, including a member shiftable to make said gear inoperative, a spring tending to shift said member to the inoperative position, and a fluid pressure device connected to the exhaust pipe and actuated thereby to shift said member to the operative position when the pressure in the pipe reaches a certain amount.

3. In a valve-controlling mechanism for steam engines, the combination with an exhaust valve, of a lifter therefor, a member between the lifter and the valve shiftable to connect or disconnect the lifter and valve, a spring bearing against said member and tending to shift the same to disconnected position, and a pipe connected to the exhaust pipe of the engine, and arranged to admit pressure to said member in opposition to the spring, to shift the member to connected position when the pressure exceeds a predetermined amount.

In testimony whereof, I affix my signature in presence of two witnesses.

ROBERT C. STEVENS.

Witnesses:
 HARRY G. ADAM,
 B. C. OLSON.